United States Patent
Ji et al.

(10) Patent No.: US 12,378,475 B2
(45) Date of Patent: Aug. 5, 2025

(54) PREPARATION METHOD FOR EMULSIFIER, EMULSIFIER, AQUEOUS EPOXY RESIN DISPERSION AND FORMULATION METHOD

(71) Applicants: WANHUA CHEMICAL GROUP CO., LTD., Yantai (CN); WANHUA CHEMICAL (NINGBO) CO., LTD., Ningbo (CN)

(72) Inventors: Xueshun Ji, Yantai (CN); Weifei Li, Yantai (CN); Rui Qu, Yantai (CN); Junying Deng, Yantai (CN); Xiao Wang, Yantai (CN); Jiakuan Sun, Yantai (CN)

(73) Assignees: WANHUA CHEMICAL GROUP CO., LTD., Yantai (CN); WANHUA CHEMICAL (NINGBO) CO., LTD., Ningbo (CN)

( * ) Notice: Subject to any disclaimer, the term of this patent is extended or adjusted under 35 U.S.C. 154(b) by 898 days.

(21) Appl. No.: 17/414,255

(22) PCT Filed: Dec. 29, 2018

(86) PCT No.: PCT/CN2018/125353
§ 371 (c)(1),
(2) Date: Jun. 15, 2021

(87) PCT Pub. No.: WO2020/133353
PCT Pub. Date: Jul. 2, 2020

(65) Prior Publication Data
US 2022/0055000 A1 Feb. 24, 2022

(51) Int. Cl.
*C09K 23/52* (2022.01)
*C08G 59/14* (2006.01)
*C08G 59/20* (2006.01)
*C08L 63/00* (2006.01)
*C09K 23/00* (2022.01)

(52) U.S. Cl.
CPC .......... *C09K 23/52* (2022.01); *C08G 59/1477* (2013.01); *C08G 59/1483* (2013.01); *C08G 59/20* (2013.01); *C08L 63/00* (2013.01); *C09K 23/00* (2022.01); *C08L 2201/54* (2013.01)

(58) Field of Classification Search
CPC .... C09K 23/52; C09K 23/00; C08G 59/1477; C08G 59/1483; C08G 59/20; C08L 63/00; C08L 2201/54
See application file for complete search history.

(56) References Cited

FOREIGN PATENT DOCUMENTS

| CN | 1324384 | A | 11/2001 |
|---|---|---|---|
| CN | 101117390 | A | 2/2008 |
| CN | 102933634 | A | 2/2013 |
| CN | 103249777 | A | 8/2013 |
| CN | 104004204 | A | 8/2014 |
| CN | 104520356 | A | 4/2015 |
| CN | 105384949 | A | 3/2016 |
| CN | 106221506 | A | 12/2016 |
| CN | 106221509 | * | 12/2016 |
| CN | 106221509 | A | 12/2016 |
| CN | 106519572 | A | 3/2017 |
| CN | 106987194 | A | 7/2017 |
| CN | 108929423 | * | 12/2018 |
| CN | 108929423 | A | 12/2018 |
| GB | 2083044 | B | 1/1984 |
| JP | S5740504 | A | 3/1982 |
| WO | 2000020499 | A1 | 4/2000 |
| WO | 2012082341 | A1 | 6/2012 |
| WO | 2014004357 | A2 | 1/2014 |

OTHER PUBLICATIONS

Li et al ("Preparation and characterization of reactive epoxy resin emulsifier based on sulphonate", Thermosetting resin, vol. 30, May 2015) (Year: 2015).*
Bao, L , et al., "Preparation and characterization of reactive epoxy resin emulsifier based on sulphonate", Thermosetting Resin 30 (3), 6 pages (2015). [English Abstract].
PCT International Search Report for PCT/CN2018/125353, 6 pages, dated Sep. 27, 2019.

* cited by examiner

Primary Examiner — Jiangtian Xu
(74) Attorney, Agent, or Firm — Viksnins Harris Padys Malen LLP

(57) ABSTRACT

A preparation method for an emulsifier, an emulsifier, an aqueous epoxy resin dispersion, and a formulation method. The preparation method for an emulsifier comprises reacting aminosulfonic acid and/or a sulfamate as a first reaction raw material with an epoxy resin in the presence of water, so as to obtain an ionic active emulsifier. The ionic active emulsifier molecule comprises at least one epoxy group from an epoxy resin and at least one sulfonic acid or sulfonate group from the first reaction raw material. The aqueous epoxy resin dispersion prepared by using the emulsifier has the characteristics of good stability and good corrosion resistance after curing, and can be used in the fields of coatings, adhesives, etc.

12 Claims, No Drawings

PREPARATION METHOD FOR EMULSIFIER, EMULSIFIER, AQUEOUS EPOXY RESIN DISPERSION AND FORMULATION METHOD

TECHNICAL FIELD

The present disclosure belongs to the field of coatings and adhesives, and relates to a preparation method for an ionic active emulsifier, an emulsifier prepared thereby, an aqueous epoxy resin dispersion including the emulsifier, and a formulation method for the aqueous epoxy resin dispersion.

BACKGROUND

Conventionally epoxy resin coatings are generally solvent-based, in which most of the organic volatiles are flammable, explosive and toxic substances. If directly discharged into the atmosphere, the organic volatiles would produce photochemical smog under ultraviolet radiation or form acid rain, and thus seriously pollute the environment. Human beings, if they inhale such toxic gases for a long time, would suffer from respiratory disease, fatigue, memory loss, or other neurological disease.

In recent years, laws and regulations on environmental pollution restrictions have been enacted, among which two major issues in the coating industry are involved, that is, the emission restriction of volatile organic compounds (VOCs) and hazardous airborne pollutants (HAPs). Therefore, the production of solvent-based coatings, which accounts for about 53% of that of the global coating industry, is limited. Nowadays, the development tendencies of high-solid coatings and water-based coatings have been commonly recognized by the coating industry, and zero- or low-VOC and water-based materials have become a research direction of new materials. Water-based epoxy coatings have many advantages. For example, such coatings have a low VOC content, a low odor, and a safe use, and they can be cleaned by water, their process technology is increasingly mature, and they meet the requirements of environmental protection and energy saving. As a result, the water-based epoxy coatings have been quickly become an important development trend of modern coatings.

The water-based epoxy resin coating mainly consists of two components: an aqueous epoxy resin dispersion system (emulsion) and an amine curing agent. The water-based two-component epoxy coating has been widely applied in the market, such as primers for high-performance containers, primers and intermediate paints for engineering machinery and rail transit, architectural coatings, equipment primers, floor paints for industrial factory buildings, vehicle primers, automotive repair primers, industrial repair primers, and the like.

As for the water-based epoxy resin, for example, it is known to prepare an epoxy emulsion using conventional non-ionic surfactants (also referred to as non-ionic emulsifiers) in equipments such as a mixer and a ball mill by a phase inversion method, mechanical grinding, and the like. However, the obtained emulsion is difficult to disperse and has poor water resistance due to the large usage amount of the emulsifier and the high viscosity of the system. A large number of free emulsifier in the system results in the instability of the emulsion system so that the latex particles are easy to agglomerate and precipitate, and thus the storage time of the emulsion is short.

In order to improve the above-mentioned defects, the Patent CN 103249777 A proposes to prepare improved epoxy functional non-ionic surfactants by reaction of an epoxy composition and an amide composition and then to prepare an aqueous epoxy dispersion having a low emulsifier content by a phase inversion method. When the dispersion is used with a curing agent which is structurally similar to the dispersion, an ideal corrosion resistance effect can be achieved. However, due to the low usage amount of the emulsifier, the particle size of the dispersion is large (800 nm to 950 nm), and thus the stability of the dispersion is poor and the thermal storage duration at 50° C. of the dispersion is less than 10 days, which affects the storage stability of the product.

The Patent CN 102933634 A proposes a method for preparing a non-ionic active emulsifier. The method can effectively improve the storage stability of the emulsion, and the non-ionic active emulsifier synthesized by the method participates in the reaction in the process of curing and film-forming, thereby improving the water resistance of the coating film. However, for this system, the usage amount of the emulsifier is large, the water resistance is poor, and the blister is serious.

The Patent CN 1324384 A proposes to disperse epoxy resins by the formulation of low-temperature and high-temperature non-ionic surfactants to obtain emulsions having good storage stability at both high and low temperatures. However, the dispersion uses a large number of emulsifiers (about 20 wt %), and the emulsifiers do not participate in the reaction after coating, a large number of emulsifiers is free from the system, so that both corrosion resistance and water resistance are greatly affected.

In order to reduce the particle size, CN 104520356 B further mentions the combined use of an ionic emulsifier and a nonionic emulsifier to reduce the particle size of the dispersion. Since the ionic emulsifier and the nonionic emulsifier are used together, a dispersion having a small particle size (400 nm to 800 nm) can be obtained using a small usage amount of emulsifiers. However, both emulsifiers used are inactive emulsifiers, which do not participate in the reaction during film formation, and thus there are free emulsifiers in the system, which affects the resistance and storage stability of the paint film.

The Patent CN 201410199227.3 mentions that a dianion emulsifier is obtained by reacting a diamine with a primary amino group as an end group with a sultone and then reacting the formed secondary amine group with an epoxy compound. There is a problem in the method that the structure of the emulsifier is uncontrollable. As a result, a large number of by-products are generated, and especially, the by-products containing the primary amine would directly cause the system to form a gel, which affects the emulsifying effect of the emulsifier, so that the emulsion system requires more emulsifiers (20% to 30%). However, when the emulsifier content is too high, the water resistance and corrosion resistance of the paint film will be directly reduced.

In the Patent CN 105384949 A, p-aminobenzenesulfonic acid is reacted with an epoxy compound in the presence of the catalyst, triphenylphosphine, and then sulfonic acid groups are neutralized by using dimethylethanolamine to obtain an anionic emulsifier. However, the presence of dimethylethanolamine groups in the emulsifier can easily catalyze the ring-opening reaction of epoxy groups by hydroxyl, which causes the epoxy emulsion system to generate gel, thereby affecting the stability of the emulsion.

SUMMARY

The object of the present disclosure is to provide a preparation method for an ionic active emulsifier, an emulsifier prepared thereby, an aqueous epoxy resin dispersion including the emulsifier, and a formulation method for the aqueous epoxy resin dispersion. The aqueous epoxy resin dispersion including the emulsifier has the characteristics of good stability and good corrosion resistance after curing.

It has been found that the aminocarboxylic acid-based ionic emulsifiers, which are commonly used in other water-based coating fields, often generate gel in the reaction with epoxy resins, and the reaction cannot be controlled. The sulfamic acid and/or sulfamate commonly used are in difficulty of reacting with epoxy resins even under very intense conditions due to their high melting point (>300° C.). However, it has been surprisingly found in the study that an aqueous solution of sulfamic acid and/or sulfamate can be smoothly reacted with epoxy resins under mild conditions to obtain a desired ionic active emulsifier. In order to achieve one aspect of the object of the present disclosure, the present disclosure provides the following technical solutions.

The present disclosure provides a preparation method for an ionic active emulsifier. The preparation method includes: reacting sulfamic acid and/or sulfamate as a first reaction raw material with an epoxy resin in the presence of water to obtain the ionic active emulsifier, wherein the molecule of the ionic active emulsifier includes at least one epoxy group from the epoxy resin and at least one sulfonic acid or sulfonate group from the first reaction raw material. In an embodiment, the sulfonate group in the molecule of the ionic active emulsifier is preferably a metal sulfonate group, more preferably a sodium sulfonate group or a potassium sulfonate group.

In the present disclosure, the sulfamic acid and/or sulfamate may be any sulfamic acid and/or sulfamate well known in this research field and capable of being present stably. For example, the sulfamic acid has a molecular structure represented by general formula (I), and the sulfamate has a molecular structure represented by general formula (II):

General formula (I)

$$\underset{\substack{|\\HN\\|\\R_3}}{}-R_2-\underset{\substack{\|\\O\\\|\\O}}{S}-OH;$$

General formula (II)

$$\underset{\substack{|\\HN\\|\\R_3}}{}-R_2-\underset{\substack{\|\\O\\\|\\O}}{S}-O^-M^+;$$

wherein $R_3$ is hydrogen or a substituted or unsubstituted organic group (that is, a bond between $R_3$ and an amino group is a N—H bond or a N—C bond), the organic group may be, for example, an alkyl group or a cycloalkyl group, and the substituent may be, for example, an amino group, wherein the alkyl group may be, for example, an alkyl group of 1 to 4 carbon atoms, the cycloalkyl group may be, for example, a cyclohexyl group, a cyclohexylmethyl group, a p-methylcyclohexyl group, a 2-methylcyclohexyl group, a 2,3-dimethylcyclohexyl group, a 3,3,5-trimethylcyclohexyl group, a 4-tert-butylcyclohexyl group, a cycloheptyl group, a cyclooctylmethyl group, a 2-norbornyl group, a 2-adamantyl group, or a 3,5-dimethyl-1-adamantyl group, and the alkyl group or cycloalkyl group substituted by an amino group may be, for example, an aminoethyl group, an aminopropyl group, or isophorone diamine; $R_2$ is a substituted or unsubstituted organic group, the organic group may be, for example, an alkyl group or a cycloalkyl group, wherein the alkyl group, the cycloalkyl group, and the substituent may each be the same as or different from those in $R_3$, for example, the substituent may be an amino group or a hydroxy group; M is preferably a metal ion such as sodium or potassium.

In an embodiment, the sulfamate is prepared from the sulfamic acid by an alkali neutralization process, and to substantially eliminate free base, the degree of neutralization may usually not exceed 99%, preferably 90% to 98%, for example, 95%.

In the present disclosure, the ring-opening reaction of epoxy groups of the epoxy resin is carried out by active hydrogen-containing amino groups of the sulfamic acid and/or sulfamate so that the amino groups may bind to the molecule of the epoxy resin to form the structure

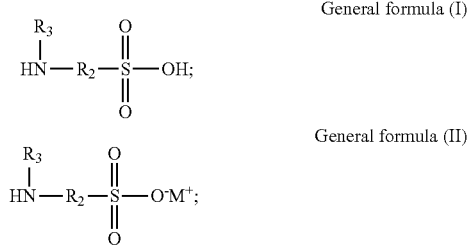

thereby obtaining the ionic active emulsifier of the present disclosure. It is to be understood by those skilled in the art that by controlling the molar ratio of the total amount of epoxy groups provided by the epoxy resin to the total amount of active hydrogens included in the amino groups in the first reaction raw material in the reaction system for preparing the ionic active emulsifier, there may be the ionic active emulsifier of the present disclosure whose molecule includes at least one epoxy group from the epoxy resin and at least one sulfonic acid or sulfonate group from the first reaction raw material in the reaction product. For example, when the above molar ratio is greater than 1:1, for example, 1.2:1 or 1.5:1 or higher (that is, when the reaction is completed, the epoxy group is still partially present in the reaction system because the epoxy group is excess), the ionic active emulsifier of the present disclosure whose molecule includes at least one epoxy group from the epoxy resin and at least one sulfonic acid or sulfonate group from the first reaction raw material is at least partially present in the reaction product; preferably, the molar ratio of the total amount of epoxy groups provided by the epoxy resin to the total amount of active hydrogens included in the amino groups in the first reaction raw material is at least 2:1, for example, 5:1, 10:1, 100:1 or higher. It is to be understood by those skilled in the art that even if the epoxy resin is in large excess, the excess resin will not become an obstacle since the remaining epoxy resin may be subsequently used for formulating the epoxy resin dispersion.

The following will be described by using an example of the reaction with bisphenol A type epoxy resin. The general structure of the ionic active emulsifier of the present disclosure can be as follows.

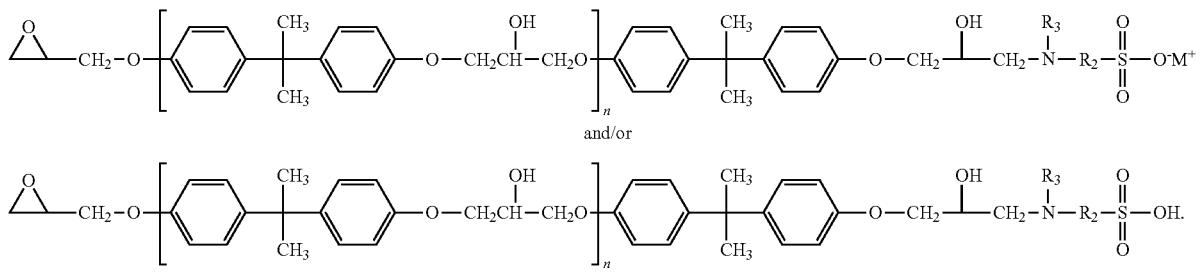

and/or

In the above formulae, $R_1$ is an organic group including 0 to 2 epoxy groups or 0 to 1 sulfonic acid group (or sulfonate group), and $R_2$ and M are as the same as those described above.

In order to make the above-mentioned ring-opening reaction to be carried out under relatively mild reaction conditions (for example, at 50° C. to 100° C.), the presence of water is required in the above-mentioned reaction system. In an embodiment, in the reaction system for preparing the ionic active emulsifier, the mass ratio of water to the first reaction raw material is not less than 1:20, preferably not less than 1:10, more preferably not less than 1:5. For example, water is introduced in the form of an aqueous solution of sulfamic acid and/or sulfamate with a solid content of 20 wt % to 50 wt %. Of course, it is to be understood by those skilled in the art that an appropriate increase in temperature will also contribute to the above ring-opening reaction.

In an embodiment, in the process of preparing the ionic active emulsifier, after the first reaction raw material is mixed with water, the mixture is reacted with the epoxy resin optionally in the presence of a solvent used for reducing the viscosity of the reaction system at a temperature of 50° C. to 150° C., for example, 70° C., 80° C., 90° C., 110° C., 120° C., 130° C., or 140° C., to carry out a ring-opening reaction of epoxy groups by amino groups to obtain the ionic active emulsifier. Preferably, the reaction temperature is 60° C. to 100° C., more preferably 80° C. to 100° C. In the present disclosure, "optionally" means that it may or may not be present. The solvent that can be used to reduce the viscosity of the reaction system is commonly used and well known in the art. For example, the solvent may be propylene glycol monomethyl ether, ethylene glycol butyl ether, dipropylene glycol dimethyl ether, acetone, butanone or butanol. In an embodiment, the sulfamic acid and/or sulfamate is/are dissolved in an appropriate amount of water, then a mixture of the epoxy resin and the solvent is added, and the reaction is directly carried out at 80° C. to 100° C. for 2 hours to 5 hours to obtain the ionic active emulsifier of the present disclosure.

In the present disclosure, the molecule of the epoxy resin includes at least two epoxy groups. These epoxy resins may be saturated or unsaturated, may be aliphatic, cycloaliphatic, aromatic or heterocyclic epoxy resins, and may also include hydroxyl groups. These epoxy resins may also include other substituents that do not cause interfering side reactions under a mixed state and reaction conditions, and such substituents may be alkyl or aryl substituents or ether groups. Preferably, the epoxy value of the epoxy resin is not greater than 0.6, preferably not greater than 0.55, for example, 0.1 to 0.55, and the epoxy resin is further preferably polyglycidyl ether.

Preferably, common polyglycidyl ether epoxy resin may be glycidyl ether of polyhydric phenol or polyhydric alcohol, wherein the polyhydric phenol is, for example, resorcinol, hydroquinone, 2,2-bis(4'-hydroxyphenyl)-propane (bisphenol A), a mixture of dihydroxydiphenylmethane (bisphenol F) isomers, 4,4'-dihydroxydiphenylcyclohexane, 4,4'-dihydroxy-3,3'-dimethyldiphenylpropane, 4,4'-dihydroxybiphenyl, bis(4'-hydroxyphenyl)-1,1-ethane, 4,4'-dihydroxybenzophenone, bis(4'-hydroxy-t-butylphenyl)-2,2-propane, bis(4'-hydroxyphenyl)-1,1-isobutane, bis(2-hydroxynaphthyl)-methane, 1,5-dihydroxynaphthalene, tris (4-hydroxyphenyl)-methane, bis(4-hydroxyphenyl) ether, bis(4-hydroxyphenyl) sulfone, or a chlorinated or brominated product of the foregoing compounds.

The polyglycidyl ether may also be polyglycidyl ether of polyhydroxy alcohol such as ethanediol-1,2-diglycidyl ether, propandiol-1,2-diglycidyl ether, propandiol-1,3-diglycidyl ether, butanediol diglycidyl ether, pentanediol diglycidyl ether, neopentyl glycol diglycidyl ether, hexanediol diglycidyl ether, diethylene glycol diglycidyl ether, dipropylene glycol diglycidyl ether, higher carbon polyoxyalkylene ethylene glycol diglycidyl ether (such as higher carbon polyoxyethylene glycol diglycidyl ether and polyoxypropylene glycol diglycidyl ether, and mixed polyoxyethylene-propylene glycol diglycidyl ether), polyoxybutylene glycol diglycidyl ether, glycerol polyglycidyl ether, trimethylolpropane polyglycidyl ether, trimethylolethane polyglycidyl ether, pentaerythritol polyglycidyl ether, sorbitol polyglycidyl ether, polyglycidyl ethers of alkoxylated polyhydric alcohols such as alkoxylated glycerol, alkoxylated trimethylolpropane and alkoxylated pentaerythritol, cyclohexanedimethanol diglycidyl ether, bis(4-hydroxycyclohexyl) methane diglycidyl ether, 2,2-bis(4-hydroxycyclohexyl) propane diglycidyl ether, castor oil polyglycidyl ether, or triglycidyl tris(2-hydroxyethyl) isocyanurate polyglycidyl ether.

Furthermore, the polyglycidyl ester may also be polyglycidyl ester of polycarboxylic acids which are prepared by reacting epichlorohydrin or similar epoxy compounds with aliphatic, cycloaliphatic or aromatic polycarboxylic acids such as oxalic acid, succinic acid, adipic acid, glutaric acid, phthalic acid, terephthalic acid, tetrahydrophthalic acid, hexahydrophthalic acid, 2,6-naphthalenedicarboxylic acid, and higher carbon dicarboxylic acid such as bi-polylinolenic acid or tri-polylinolenic acid. Examples include diglycidyl esters of adipic acid, phthalic acid, and hexahydrophthalic acid.

The present disclosure further provides an ionic active emulsifier prepared by the preparation method described above.

In order to achieve another aspect of the object of the present disclosure, the present disclosure provides the following technical solutions.

The present disclosure provides an aqueous epoxy resin dispersion which includes the above-mentioned ionic active emulsifier. It is to be understood by those skilled in the art that, in order to achieve a good emulsifying dispersion effect, the content of the emulsifier in the dispersion is generally not too low, and when the content of the emulsifier is too high, there will be a problem of high costs. On the basis that the ionic active emulsifier of the present disclosure has an excellent emulsifying effect, in an embodiment, the total content of sulfonic acid groups and sulfonate groups of the ionic active emulsifier is 0.01 wt % to 20 wt %, preferably 0.2 wt % to 5 wt %, for example, 0.5 wt %, 1 wt %, or 2 wt %, of the total solid mass in the aqueous epoxy resin dispersion. For "the total content of sulfonic acid groups and sulfonate groups", it is to be understood by those skilled in the art that, when the dispersion only includes one kind of these two groups, "the total content of sulfonic acid groups and sulfonate groups" refers to the content of this kind of groups.

As is known in the art that both an ionic emulsifier and a non-ionic emulsifier are employed to provide an emulsifying effect, in a preferred embodiment, the aqueous dispersion further includes at least one non-ionic active emulsifier. It is to be understood by those skilled in the art that the content of the non-ionic active emulsifier may be high. For example, the content of the non-ionic active emulsifier is 0.1 wt % to 90 wt %, preferably 1 wt % to 45 wt %, for example, 5 wt %, 10 wt %, 15 wt %, or 30 wt %, more preferably 1 wt % to 20 wt %, of the total solid mass in the aqueous epoxy resin dispersion.

The molecule of the non-ionic active emulsifier includes at least one epoxy group to participate in the reaction upon curing, and the non-ionic active emulsifier may be a non-ionic active emulsifier well known in the art. In an embodiment, the non-ionic active emulsifier is prepared in the following manner:

mixing polyetheramine with an epoxy resin, and carrying out a ring-opening reaction using amino groups of the polyetheramine and epoxy groups of the epoxy resin to obtain the non-ionic active emulsifier, wherein the molecule of the non-ionic active emulsifier includes at least one epoxy group from the epoxy resin. The reaction may be carried out without a catalyst due to the catalytic effect of the amino groups. In an embodiment, the reaction condition of the ring-opening reaction may be that the reaction is carried out at 40° C. to 140° C., for example, 60° C., 80° C., 100° C., or 130° C., preferably 120° C. to 140° C., for 1 hour to 5 hours, preferably 1 hour to 3 hours.

It is to be understood by those skilled in the art that by controlling the molar ratio of the total amount of epoxy groups provided by the epoxy resin to the total amount of active hydrogens included in the amino groups in polyetheramine in the reaction system for preparing the non-ionic active emulsifier, there may be the non-ionic active emulsifier of the present disclosure whose molecule includes at least one epoxy group from the epoxy resin. For example, when the above molar ratio is controlled to be greater than 1:1, for example, 1.2:1 or 1.5:1 or higher (that is, when the reaction is completed, the epoxy group is still partially present in the reaction system because the epoxy group is excess), the non-ionic active emulsifier of the present disclosure whose molecule includes at least one epoxy group from the epoxy resin is at least partially present in the reaction product; preferably, the molar ratio of the total amount of epoxy groups provided by the epoxy resin to the total amount of active hydrogens included in the amino groups in polyetheramine is at least 2:1, for example, 5:1, 10:1, 100:1 or higher.

In an embodiment, the non-ionic active emulsifier is prepared in the following manner:

mixing a polyether-anhydride product whose molecule includes at least one carboxyl group with an epoxy resin whose molecule includes at least two epoxy groups, and carrying out a ring-opening reaction using the carboxyl group(s) of the polyether-anhydride product and the epoxy groups of the epoxy resin to obtain the non-ionic active emulsifier, wherein the molecule of the non-ionic active emulsifier includes at least one epoxy group from the epoxy resin. In an embodiment, the reaction condition of the ring-opening reaction may be that the reaction is carried out under the action of a catalyst at 40° C. to 140° C., for example, 60° C., 80° C., 100° C., or 130° C., preferably 120° C. to 140° C., for 1 hour to 5 hours, preferably 1 hour to 3 hours. The catalyst in the above ring-opening reaction is well known in the art. For example, the catalyst is one or more of triphenylphosphine, triphenylphosphine, or boron trifluoride diethyl ether. The amount of the catalyst may be 0.04 wt % or more, preferably 0.05 wt % to 1 wt %, for example, 0.1 wt %, 0.2 wt %, 0.5 wt %, or 0.8 wt %, of the total solid mass in the reaction system.

It is to be understood by those skilled in the art that by controlling the molar ratio of the total amount of epoxy groups provided by the epoxy resin to the total amount of the carboxyl group(s) in the polyether-anhydride product in the reaction system for preparing the non-ionic active emulsifier, there may be the non-ionic active emulsifier of the present disclosure whose molecule includes at least one epoxy group from the epoxy resin. For example, when the above molar ratio is controlled to be greater than 1:1, for example, 1.2:1 or 1.5:1 or higher (that is, when the reaction is completed, the epoxy group is still partially present in the reaction system because the epoxy group is excess), the non-ionic active emulsifier of the present disclosure whose molecule includes at least one epoxy group from the epoxy resin is at least partially present in the reaction product; preferably, the molar ratio of the total amount of epoxy groups provided by the epoxy resin to the total amount of the carboxyl group(s) in the polyether-anhydride product is at least 1:1, for example, 2:1, 5:1, 10:1, 100:1 or higher.

The epoxy resin may be one or more of epoxy resins mentioned above.

In an embodiment, the polyether-anhydride product is obtained by subjecting a polyether and an anhydride from a polycarboxylic acid whose molecule includes 2 to 4 carboxyl groups to an esterification reaction.

The initiator for preparing the polyether may be: saturated monohydric alcohols, such as methanol, ethanol, n-propanol, isopropanol, n-butanol, isobutanol, sec-butanol, isomeric pentanol, hexanol, octanol, nonanol, n-decanol, n-dodecanol, n-tetradecanol, n-hexadecanol, cyclohexanol, hydroxymethylcyclohexane, or 3-ethyl-3-hydroxymethyl-oxetane; unsaturated alcohols, such as allyl alcohol, 1,1-dimethyl-allyl alcohol, or oleyl alcoho; aromatic alcohols, such as phenol, isomeric cresol, or methoxyphenol; aromatic aliphatic alcohols, such as benzyl alcohol, anisyl alcohol, or cinnamyl alcohol; secondary monoamines, such as dimethylamine, diethylamine, dipropylamine, diisopropylamine, di-n-butylamine, diisobutylamine, bis(2-ethylhexyl)-amine, N-methyl-cyclohexylamine, N-ethyl-cyclohexylamine, or dicyclohexyl amine; or heterocyclic secondary amines, such as morpholine, pyrrolidine, or piperidineethyl pyrazole. The initiator is preferably a saturated monohydric alcohol having up to 4 carbon atoms, particularly preferably methanol.

The polymerization unit for preparing the polyether may be one or both of propylene oxide and ethylene oxide, wherein the amount of ethylene oxide is at least 50 mol %, preferably at least 80 mol %, based on the total mole of the polymerization unit. The number average molecular weight of the prepared polyether may be 300 to 8000, preferably 500 to 6000, and the number of ethoxy units may be 10 to 300, preferably 10 to 150.

There is no particular limitation to the anhydride as long as the anhydride used herein from a polycarboxylic acid whose molecule includes 2 to 4 carboxyl groups is an anhydride obtained by subjecting the polycarboxylic acid whose molecule includes 2 to 4, preferably 3, carboxyl groups to intramolecular dehydration, and the anhydride may be, for example, the anhydride known in the art such as an anhydride from aromatic polycarboxylic acid or an anhydride from a cyclic aliphatic polycarboxylic acid, preferably an anhydride from aromatic polycarboxylic acid. Examples of the anhydride from the aromatic polycarboxylic acid include trimellitic anhydride, pyromellitic anhydride, and benzophenone-3,3',4,4'-tetracarboxylic anhydride, among which, the anhydride from the aromatic polycarboxylic acid is preferably trimellitic anhydride. Examples of the anhydride from the cyclic aliphatic polycarboxylic acid include hydrogenated trimellitic anhydride and hydrogenated pyromellitic anhydride.

When the esterification reaction is carried out, the ratio of the total amount of the anhydride groups (—COOCO—) of the anhydride to the total amount of the hydroxyl groups of the polyether is 1 to 1.2, more preferably 1.0 to 1.1. When the ratio of the anhydride groups is less than 1, hydroxyl groups remain in the water-dispersible epoxy resin, so the ratio of the anhydride groups is preferably not less than 1.

Furthermore, the reaction temperature of the esterification reaction may be 40° C. to 140° C., preferably 80° C. to 130° C.; and the reaction time of the esterification reaction may be 1 hour to 5 hours, preferably 1 hour to 3 hours. In the above esterification reaction, catalysts and/or solvents well known in the art may also be used as needed.

In an embodiment, the molecule of the non-ionic active emulsifier includes at least 10 ethoxy segments (also referred to as ethylene oxide segments) to facilitate the hydrophilicity of the non-ionic active emulsifier; preferably, in the molecule of the non-ionic active emulsifier, the content of ethoxy units bonded to polyether chains is greater than 40 wt %, preferably 40 wt % to 90 wt %, further preferably 60 wt % to 85 wt %.

In order to achieve yet another aspect of the object of the present disclosure, the present disclosure further provides a formulation method for the aqueous epoxy resin dispersion. It is to be understood that, in addition to the emulsifier, epoxy resin and water, other auxiliaries are generally added to the dispersion, such as an epoxy active diluent (whose amount is 0 to 20% of the dispersion, such as glycidyl ether composition of $C_8$ to $C_{14}$, phenyl glycidyl ether, and butyl glycidyl ether), a solvent (whose amount is 0 to 20 wt % of the dispersion, such as propylene glycol monomethyl ether (PMOP), ethylene glycol monobutyl ether, dipropylene glycol dimethyl ether, acetone, butanone, and butanol), a thickening agent (whose amount is 0 to 5 wt % of the dispersion, such as U905 and U300), an antifoaming agent (whose amount is 0 to 1 wt % of the dispersion, such as Foamstar 2410, 902w, BYK-024, BYK-033, BYK-028, and A1001), and other commonly used auxiliaries. The addition of these auxiliaries is well known in the art and will not be described herein.

In the present disclosure, the formulation method for the aqueous epoxy resin dispersion is as follows:

method 1: adding a material that includes the ionic active emulsifier and the optional non-ionic active emulsifier in proportion required for formulating the aqueous epoxy resin dispersion to an epoxy resin, and adding water to disperse the material to form an epoxy resin aqueous dispersion; that is, adding the prepared ionic active emulsifier, non-ionic active emulsifier (if there is), and other materials to be added in proportion required for formulating the target aqueous epoxy resin dispersion to the epoxy resin, and adding water to disperse them to form the aqueous epoxy resin dispersion; or method 2: adding remaining materials in proportion required for formulating the aqueous epoxy resin dispersion to a system including the ionic active emulsifier and the optional non-ionic active emulsifier, and dispersing the remaining materials and the system to form an aqueous epoxy resin dispersion, wherein at least one of the ionic active emulsifier and the optional non-ionic active emulsifier is prepared in the system; that is, as is understood by those skilled in the art, the system may be a mixture of the reaction system after the preparation of the ionic active emulsifier and the added non-ionic active emulsifier (if there is), or a mixture of the reaction system after the preparation of the non-ionic active emulsifier and the added ionic active emulsifier, or a reaction system after the preparation of the ionic active emulsifier and the non-ionic active emulsifier in the same system, for example, a system including the ionic active emulsifier and the non-ionic active emulsifier, which is obtained by adding materials required for the preparation of the ionic active emulsifier and the non-ionic active emulsifier to a system and reacting. The method 2 is particularly suitable for the case where there is an excessive amount of epoxy resin in the preparation of an emulsifier, which can save steps and facilitate industrial production.

The present disclosure has the following beneficial effects.

When the active emulsifier including sulfonic acid groups and/or sulfonate groups of the present disclosure is used in an aqueous epoxy resin dispersion, even with a small amount of the active emulsifier, an aqueous epoxy resin dispersion with good storage stability and excellent corrosion resistance and water resistance after curing can be obtained, and when the active emulsifier is used in combination with a non-ionic active emulsifier, the performance of the resulting aqueous epoxy resin dispersion will be even better. Meanwhile, it is also surprisingly found that even with a very small amount of the ionic active emulsifier, the amount of the non-ionic emulsifier used in combination with the above ionic active emulsifier can be greatly reduced, thereby reducing the total amount of emulsifiers used in the system and further improving the stability and corrosion resistance of the dispersion.

The aqueous epoxy resin dispersion obtained according to the present disclosure has good storage stability and excellent corrosion resistance and water resistance after curing, and thus can be applied to the field of coatings and adhesives.

DETAILED DESCRIPTION

The present disclosure will be further described in detail through the following examples, but the following examples shall not be construed as limitations to the scope of the present disclosure. Without departing from the above method ideas of the present disclosure, various substitutions or changes made in accordance with the general technical knowledge and conventional means of the art shall be included within the scope of the present disclosure.

Materials used in Examples and Comparative Examples are shown in the following table.

TABLE 1

| Material | Form | Supplier | CAS No. |
|---|---|---|---|
| Aminoethanesulfonic acid | Solid | Wanhua Chemical | 107-35-7 |
| N-aminoethylethanesulfonic acid | Solid | alading | 34730-59-1 |
| 3-(cyclohexamino)-propanesulfonic acid | Solid | alading | 1135-40-6 |
| Polyethylene glycol | Solid | Wanhua Chemical | 25322-68-3 |
| Polyethylene glycol methyl ether | Solid | Wanhua Chemical | 9004-74-4 |
| Polyetheramine | Liquid | Taiga Additive | 9046-10-0 |
| Epoxy resin (E12/E20/E44/E51) | Solid/liquid | Baling Sinopec | 25068-38-6 |
| Trimellitic anhydride | Solid | TCI | 522-30-7 |
| Pyromellitic anhydride | Solid | TCI | 89-32-7 |
| Hexahydrophthalic anhydride | Solid | TCI | 85-42-7 |

In the following Examples and Comparative Examples, the reagents used are analytical pure, unless otherwise specified; the sulfamate used is obtained by neutralizing the corresponding sulfamic acid with sodium hydroxide or potassium hydroxide; and the content is mass content, unless otherwise specified.

Preparation of an Ionic Active Emulsifier A

Example 1a: 800 g of epoxy resin E12 (that is, the epoxy value was 0.12) and 200 g of PMOP were added to 70 g of aminoethanesulfonic acid (where the solid content was 20% and the rest was water), the temperature was slowly raised to 80° C., the mixture was stirred for reaction under reflux at constant temperature for about 1 hour, and after the epoxy value was measured to be 0.035 mol/100 g (by the hydrochloric acid-acetone method, which was used in the following Examples and Comparative Examples), which basically reached the theoretical epoxy value, an ionic active emulsifier was obtained.

Example 1b: 100 g of epoxy resin E44 and 30 g of PMOP were added to 70 g of 3-(cyclohexamino)-propanesulfonic salt (neutralized with potassium hydroxide with a neutralization degree of 95%, where the solid content was 50% and the rest was water), the temperature was slowly raised to 80° C., the mixture was stirred for reaction under reflux at constant temperature for about 1 hour, and after the epoxy value was measured to be 0.24 mol/100 g, which basically reached the theoretical epoxy value, an ionic active emulsifier was obtained.

Example 1c: 230 g of epoxy resin E51 and 50 g of PMOP were added to 70 g of N-aminoethylethanesulfonic salt (neutralized with sodium hydroxide with a neutralization degree of 98%, where the solid content was 30% and the rest was water), the temperature was slowly raised to 80° C., the mixture was stirred for reaction under reflux at constant temperature for about 1 hour, and after the epoxy value was measured to be 0.28 mol/100 g, which basically reached the theoretical epoxy value, an ionic active emulsifier was obtained.

Comparative Example 1a: 800 g of epoxy resin E12 and 200 g of PMOP were added to 14 g of aminoethanesulfonic acid (solid, with a melting point of >300° C.), the temperature was slowly raised to 80° C., and the mixture was stirred for reaction at constant temperature for about 5 hours. There was still a large amount of white solid in the system, and after a detection, the white solid was found to be aminoethanesulfonic acid and/or aminoethanesulfonic salt, indicating that aminoethanesulfonic acid and/or aminoethanesulfonic salt failed to be reacted with the epoxy resin to prepare an emulsifier under the above conditions.

Comparative Example 1b: 180 g of epoxy resin E44 and 90 g of PMOP were added to 35 g of 3-(cyclohexamino)-propanesulfonic potassium (solid, with a melting point of >300° C.), the temperature was slowly raised to 80° C., and the mixture was stirred for reaction at constant temperature for about 5 hours. There was still a large amount of white solid in the system, and after a detection, the white solid was found to be cyclohexaminopropanesulfonic acid and/or cyclohexaminopropanesulfonic salt, indicating that cyclohexaminopropanesulfonic acid and/or cyclohexaminopropanesulfonic salt failed to be reacted with the epoxy resin E20 to prepare an emulsifier under the above conditions.

Comparative Example 1c: 90 g of epoxy resin E51 and 50 g of PMOP were added to 21 g of N-aminoethylethanesulfonic sodium (solid, with a melting point of >300° C.), the temperature was slowly raised to 80° C., and the mixture was stirred for reaction at constant temperature for about 5 hours. There was still a large amount of white solid in the system, and after a detection, the white solid was found to be N-aminoethylethanesulfonic acid and/or N-aminoethylethanesulfonic salt, indicating that N-aminoethylethanesulfonic acid and/or N-aminoethylethanesulfonic salt failed to be reacted with the epoxy resin to prepare an emulsifier under the above conditions.

According to the above Examples and Comparative Examples, it was surprisingly found that it was difficult for solid sulfamic acid and/or sulfamate to react with the epoxy resin, but when they were mixed with water, the reaction could proceed smoothly under relatively mild conditions. The synthesis method of Examples 1a to 1c was experimentally verified to be also suitable for the reaction of other derivatives of sulfamic acid and/or sulfamate having similar structures with the epoxy resin.

Preparation of a Non-Ionic Active Emulsifier B

Example 2a: Synthesis route of a non-ionic active emulsifier B: 1000 g of molten and dehydrated polyethylene glycol (with a molecular weight of 6000 and an EO content of not less than 80 wt %) was injected into a reaction kettle, the kettle temperature was maintained at 80° C., then 53 g of hexahydrophthalic anhydride was added into the reaction kettle, the temperature was raised to 100° C., and the reaction was carried out for about 3 hours; after the acid value of the sample was tested to reach the theoretical value of 10 mgKOH/g, 210 g of liquid epoxy resin E20 was injected, after stirring evenly, 3.5 g of a triphenylphosphine (TPP) catalyst was added, the reaction was carried out at a constant temperature of 130° C. for 3 hours, and after the acid value was tested to be −0.25 mgKOH/g, the material was discharged.

Example 2b: Synthesis route of a non-ionic active emulsifier B: 1000 g of molten and dehydrated polyetheramine (with a molecular weight of 3000, Taiga Additive M-2070) was injected into a reaction kettle, the kettle temperature was maintained at 100° C., then 350 g of liquid epoxy resin E44 was injected, after stirring evenly, the reaction was carried out at a constant temperature of 130° C. for 3 hours, and after the epoxy value was tested to be 0.075 mol/100 g, the material was discharged.

Example 2c: Synthesis route of a non-ionic active emulsifier B: 2000 g of molten and dehydrated polyethylene glycol monomethyl ether (with a molecular weight of 8000 and an EO content of not less than 80 wt %) was injected into a reaction kettle, the kettle temperature was maintained at 100° C., then 53 g of trimellitic anhydride was added into the reaction kettle, the temperature was raised to 130° C., and the reaction was carried out for about 3 hours; after the acid value of the sample was tested to reach the theoretical value of 7 mgKOH/g, 170 g of liquid epoxy resin E51 was injected, after stirring evenly, 6 g of a triphenylphosphine (TPP) catalyst was added, the reaction was carried out at a constant temperature of 130° C. for 3 hours, and after the acid value was tested to be −0.4 mgKOH/g, the material was discharged.

Preparation of an Aqueous Epoxy Resin Dispersion

Example 3a: 400 g of molten epoxy resin E20 was injected into a dispersion kettle, the temperature in the kettle was maintained at 100° C., then an active emulsifier A (80 g, obtained in Example 1a) and a solvent of propylene glycol monomethyl ether (PMOP) (70 g) were injected, and the above materials were stirred and mixed at 800 r/min for 20 minutes; after that, the temperature was lowered to 75° C., the rotational speed was raised to 1200 r/min, and 350 g of deionized water was dripped within 2 hours (the first ½ amount of water was slowly dripped); after the completion of dripping, the system was cooled to 50° C. for discharging. The test results of the dispersion are as follows.

The particle size of the dispersion was about 510 nm (test instrument: Zetasizer Nano ZS, test method: dispersing the dispersion in deionized water, which were also used in the following Examples and Comparative Examples).

The total content of sulfonic acid and sulfonate groups was 0.73 wt % (the test criterion or method of determination was: the total amount of added sulfonic acid and sulfonate groups divided by the total mass of the emulsion, which was also used in following Examples and Comparative Examples).

The viscosity was 1500 cp (test instrument: Brookfield viscometer DV1, test method: direct test at 25° C., which were also used in following Examples and Comparative Examples).

The solid content was 53%.

Example 3b: 400 g of molten epoxy resin E20 was injected into a dispersion kettle, the temperature in the kettle was maintained at 100° C., then an active emulsifier A (80 g, obtained in Example 1b) and a solvent of propylene glycol monomethyl ether (PMOP) (76 g) were injected, and the above materials were stirred and mixed at 800 r/min for 20 minutes; after that, the temperature was lowered to 75° C., the rotational speed was raised to 1200 r/min, and 380 g of deionized water was dripped within 2 hours (the first ½ amount of water was slowly dripped); after the completion of dripping, the system was cooled to 50° C. for discharging. The test results of the dispersion are as follows.

The particle size of the dispersion was about 420 nm.

The total content of sulfonic acid and sulfonate groups was 1.46 wt %.

The viscosity was 950 cp.

The solid content was 51%.

Example 3c: 400 g of molten epoxy resin E20 was injected into a dispersion kettle, the temperature in the kettle was maintained at 100° C., then an active emulsifier A (95 g, obtained in Example 1c) and a solvent of propylene glycol monomethyl ether (PMOP) (95 g) were injected, and the above materials were stirred and mixed at 800 r/min for 20 minutes; after that, the temperature was lowered to 75° C., the rotational speed was raised to 1200 r/min, and 400 g of deionized water was dripped within 2 hours (the first ½ amount of water was slowly dripped); after the completion of dripping, the system was cooled to 50° C. for discharging. The test results of the dispersion are as follows.

The particle size of the dispersion was about 380 nm.

The total content of sulfonic acid and sulfonate groups was 1.63 wt %.

The viscosity was 730 cp.

The solid content was 50%.

Example 3d-1: 400 g of molten epoxy resin E20 was injected into a dispersion kettle, the temperature in the kettle was maintained at 100° C., then an active emulsifier A (40 g, obtained in Example 1a), a non-ionic active emulsifier B (70 g, obtained in Example 2a), and a solvent of propylene glycol monomethyl ether (PMOP) (80 g) were injected, and the above materials were stirred and mixed at 800 r/min for 20 minutes; after that, the temperature was lowered to 75° C., the rotational speed was raised to 1200 r/min, and 400 g of deionized water was dripped within 2 hours (the first ½ amount of water was slowly dripped); after the completion of dripping, the system was cooled to 50° C. for discharging. The test results of the dispersion are as follows.

The particle size of the dispersion was about 530 nm.

The total content of sulfonic acid and sulfonate groups was 0.34 wt %.

The viscosity was 1200 cp.

The solid content was 52%.

Example 3d-2: 400 g of molten epoxy resin E20 was injected into a dispersion kettle, the temperature in the kettle was maintained at 100° C., then an active emulsifier A (40 g, obtained in Example 1b), a non-ionic active emulsifier B (70 g, obtained in Example 2b), and a solvent of propylene glycol monomethyl ether (PMOP) (80 g) were injected, and the above materials were stirred and mixed at 800 r/min for 20 minutes; after that, the temperature was lowered to 75° C., the rotational speed was raised to 1200 r/min, and 400 g of deionized water was dripped within 2 hours (the first ½ amount of water was slowly dripped); after the completion of dripping, the system was cooled to 50° C. for discharging. The test results of the dispersion are as follows.

The particle size of the dispersion was about 570 nm.

The total content of sulfonic acid and sulfonate groups was 0.32 wt %.

The viscosity was 1050 cp.

The solid content was 51%.

Example 3D-3

Preparation of a dispersion by a one-step method: 56 g of polyetheramine (with a molecular weight of 2000), 3.5 g of aminoethanesulfonic acid, 450 g of epoxy resin E20, and 80 g of a solvent of propylene glycol methyl ether were added into a dispersion kettle at the same time, the temperature was raised to 100° C., the reaction was carried out for 2.5 h, and after the reaction was completed, the materials in the kettle were stirred and mixed at 800 r/min for 20 minutes; after that, the temperature was lowered to 75° C., the rotational speed was raised to 1200 r/min, and 400 g of deionized water was dripped within 2 hours (the first ½ amount of water was slowly dripped); after the completion of dripping, the system was cooled to 50° C. for discharging. The test results of the dispersion are as follows.

The particle size of the dispersion was about 502 nm.

The total content of sulfonic acid and sulfonate groups was 0.68 wt %.

The viscosity was 930 cp.

The solid content was 51%.

Example 3e: 400 g of molten epoxy resin E20 was injected into a dispersion kettle, the temperature in the kettle was maintained at 100° C., then a non-ionic active emulsifier B (110 g, obtained in Example 2a) and a solvent of propylene glycol monomethyl ether (PMOP) (70 g) were injected, and the above materials were stirred and mixed at 800 r/min for 20 minutes; after that, the temperature was lowered to 75° C., the rotational speed was raised to 1200 r/min, and 400 g of deionized water was dripped within 2 hours (the first ½ amount of water was slowly dripped); after the completion of dripping, the system was cooled to 50° C. for discharging. The test results of the dispersion are as follows.

The particle size of the dispersion was about 1100 nm.

The total content of sulfonic acid and sulfonate groups was 0 wt %.

The viscosity was 5800 cp.

The solid content was 52%.

Example 3f: 400 g of molten epoxy resin E20 was injected into a dispersion kettle, the temperature in the kettle was maintained at 100° C., then a non-ionic active emulsifier B (110 g, obtained in Example 2b) and a solvent of propylene glycol monomethyl ether (PMOP) (80 g) were injected, and the above materials were stirred and mixed at 800 r/min for 20 minutes; after that, the temperature was lowered to 75° C., the rotational speed was raised to 1200 r/min, and 400 g of deionized water was dripped within 2 hours (the first ½ amount of water was slowly dripped); after the completion of dripping, the system was cooled to 50° C. for discharging. The test results of the dispersion are as follows.

The particle size of the dispersion was about 980 nm.

The total content of sulfonic acid and sulfonate groups was 0 wt %.

The viscosity was 4300 cp.

The solid content was 51%.

Example 3g: 400 g of molten epoxy resin E20 was injected into a dispersion kettle, the temperature in the kettle was maintained at 100° C., then a non-ionic active emulsifier B (110 g, obtained in Example 2c) and a solvent of propylene glycol monomethyl ether (PMOP) (80 g) were injected, and the above materials were stirred and mixed at 800 r/min for 20 minutes; after that, the temperature was lowered to 75° C., the rotational speed was raised to 1200 r/min, and 400 g of deionized water was dripped within 2 hours (the first ½ amount of water was slowly dripped); after the completion of dripping, the system was cooled to 50° C. for discharging. The test results of the dispersion are as follows.

The particle size of the dispersion was about 920 nm.

The total content of sulfonic acid and sulfonate groups was 0 wt %.

The viscosity was 5200 cp.

The solid content was 51%.

Performance test of the aqueous epoxy resin dispersion:

TABLE 2

Component I

| Composition | Supplier | Mass ratio wt % |
|---|---|---|
| $H_2O$ | | 10.0 |
| Dispersant BYK190 | BYK | 2.0 |
| pH regulator AMP-95 | Angus | 0.2 |
| Antifoaming agent BYK024 | BYK | 0.3 |
| Titanium white R902 | DuPont | 6.0 |
| Barium sulfate | Jiande Chemistry | 10.0 |
| Zinc phosphate | Sanjing | 8.0 |
| Wollastonite | Jiangxi Aote | 14.0 |
| Carbon black FW200 | Evonik | 0.5 |
| Aqueous epoxy resin dispersion | Form Examples/Comparative Examples 3a to 3g | 48.0 |
| Wetting agent BYK346 | BYK | 0.3 |
| Flash-rust inhibitor FA179 | Elementis | 0.2 |
| Thickening agent U905 | Wanhua Chemical | 0.5 |
| Total | | 100.0 |

TABLE 3

Component II

| Composition | Supplier | Mass ratio wt % |
|---|---|---|
| Epoxy curing agent EPIKURE8530 | Hexion Chemistry | 40 |
| Film-forming auxiliary DpnB | Dow Chemical | 20 |
| $H_2O$ | | 40 |
| Total | | 100 |

The water-based epoxy antirust paint Component I prepared according to Table 2 and Component II prepared according to Table 3 were mixed in a ratio of 8.5:1 and then cured for half an hour. The two-component epoxy paint was coated on the surface-polished carbon steel sheet with a dry film thickness of 70 um to 80 um, leveled at room temperature for 10 minutes to 15 minutes, baked at 80° C. for 30 minutes, and cured at 25° C. for 7 days to obtain a two-component epoxy cured film. Determination of resistance to neutral salt spray was carried out according to GB/T 1771. Within the specified test time (500 hours), when the blank part of the sheet surface is free of rust and foaming and the rust and foaming diffusion width at the notch part of the sheet surface is less than 2 mm, the resistance to neutral salt spray is scored 5; when the blank part of the sheet surface is free of rust and has a small amount of foaming and the rust and foaming diffusion width at the notch part of the sheet surface is less than 2 mm, the resistance to neutral salt spray is scored 4; when the blank part of the sheet surface shows rust and foaming and the rust and foaming diffusion width at the notch part of the sheet surface is less than 2 mm, the resistance to neutral salt spray is scored 3. The test results are shown in Table 4.

TABLE 4

| | Dispersion Examples/Comparative Examples | | | | | | | | |
|---|---|---|---|---|---|---|---|---|---|
| | 3a | 3b | 3c | 3d-1 | 3d-2 | 3d-3 | 3e | 3f | 3g |
| Content of sulfonic acid and/or sulfonate (wt %) | 0.73 | 1.46 | 1.63 | 0.34 | 0.32 | 0.35 | 0 | 0 | 0 |
| Dispersion particle size (nm) | 510 | 420 | 380 | 530 | 570 | 502 | 1100 | 980 | 920 |
| Dispersion storage duration at 50° C. (day) | 23 | 19 | 28 | 35 | 29 | 30 | 3 | 10 | 9 |
| Epoxy paint salt spray resistance (500 h) | 5 | 5 | 5 | 5 | 5 | 5 | 3 | 4 | 4 |
| Dispersion shelf life (month) | >15 | >12 | >15 | >20 | >15 | >15 | <3 | <6 | <6 |

From the comparison of the above properties, it can be seen that the addition of a small amount of the active emulsifier A including sulfonic acid and/or sulfonate can effectively reduce the particle size of the dispersion, improve the stability of the dispersion, and improve the salt spray resistance of the product.

What is claimed is:

1. An aqueous epoxy resin dispersion, comprising an ionic active emulsifier prepared by reacting sulfamic acid and/or sulfamate as a first reaction raw material with an epoxy resin to obtain the ionic active emulsifier, wherein the molecule of the ionic active emulsifier comprises at least one epoxy group from the epoxy resin and at least one sulfonic acid or sulfonate group from the first reaction raw material, and at least one non-ionic active emulsifier, wherein the total content of sulfonic acid groups and sulfonate groups of the ionic active emulsifier is 1.46 wt % to 50 wt % of the total solid mass in the aqueous epoxy resin dispersion; wherein the non-ionic active emulsifier is prepared by a method consisting essentially of: mixing a polyether-anhydride reactant whose molecule comprises at least one carboxyl group with an epoxy resin whose molecule comprises at least two epoxy groups, and carrying out a ring-opening reaction using the carboxyl group(s) of the polyether-anhydride reactant and the epoxy groups of the epoxy resin to obtain the non-ionic active emulsifier, wherein the molar ratio of the total amount of epoxy groups of the epoxy resin to the total amount of carboxyl group(s) of the polyether-anhydride reactant is at least 1:1.

2. The aqueous epoxy resin dispersion according to claim 1, wherein the content of the non-ionic active emulsifier is 0.1 wt % to 90 wt % of the total solid mass in the aqueous epoxy resin dispersion.

3. The aqueous epoxy resin dispersion according to claim 1, wherein the non-ionic active emulsifier is prepared by:
mixing polyetheramine with an epoxy resin, and carrying out a ring-opening reaction using amino groups of the polyetheramine and epoxy groups of the epoxy resin to obtain the non-ionic active emulsifier, wherein the molecule of the non-ionic active emulsifier comprises at least one epoxy group from the epoxy resin.

4. The aqueous epoxy resin dispersion according to claim 3, wherein during preparation, the molar ratio of the total amount of epoxy groups of the epoxy resin to the total amount of active hydrogens comprised in the amino groups of the polyetheramine is at least 2:1.

5. The aqueous epoxy resin dispersion according to claim 3, wherein the reaction condition of the ring-opening reaction is that the reaction is carried out for 1 hour to 5 hours at 40° C. to 140° C.

6. The aqueous epoxy resin dispersion according to claim 1, wherein the reaction condition of the ring-opening reaction is that the reaction is carried out for 1 hour to 5 hours under the action of a catalyst at 40° C. to 140° C.; the catalyst is triphenylphosphine or boron trifluoride diethyl ether.

7. The aqueous epoxy resin dispersion according to claim 1, wherein the polyether-anhydride reactant is obtained by subjecting a polyether polyol and an anhydride from a polycarboxylic acid whose molecule comprises 2 to 4 carboxyl groups to an esterification reaction, wherein the molar ratio of the total amount of anhydride groups of the anhydride to the total amount of hydroxyl groups of the polyether polyol is 1 to 1.2.

8. The aqueous epoxy resin dispersion according to claim 7, wherein the reaction temperature of the esterification reaction is 40° C. to 150° C.

9. The aqueous epoxy resin dispersion according to claim 6, wherein the amount of the catalyst is 0.05 wt % to 2 wt % of the total solid mass in the reaction system.

10. The aqueous epoxy resin dispersion according to claim 1, wherein the molecule of the non-ionic active emulsifier comprises at least 10 ethoxy segments and at least one epoxy group.

11. The aqueous epoxy resin dispersion according to claim 1, wherein in the molecule of the non-ionic active emulsifier, the content of ethoxy units bonded to polyether chains is 40 wt % to 95 wt %.

12. A formulation method of the aqueous epoxy resin dispersion according to claim 1, comprising:
adding a material comprising the ionic active emulsifier and the optional non-ionic active emulsifier in proportion required for formulating the aqueous epoxy resin dispersion to an epoxy resin, and adding water to disperse the material to form an epoxy resin aqueous dispersion; or
adding remaining materials in proportion required for formulating the aqueous epoxy resin dispersion to a system comprising the ionic active emulsifier and the optional non-ionic active emulsifier, and dispersing the remaining materials and the system to form an aqueous epoxy resin dispersion; wherein at least one of the ionic active emulsifier and the optional non-ionic active emulsifier is prepared in the system.

* * * * *